United States Patent [19]

Hino et al.

[11] Patent Number: 4,852,106

[45] Date of Patent: Jul. 25, 1989

[54] OPTICAL SYSTEM FOR PRODUCING CONTROLLED BEAT FREQUENCY

[75] Inventors: Motohito Hino, Nagoya; Yoshinori Bessho, Mie, both of Japan

[73] Assignee: Brother Kogyo Kabushiki Kaisha, Japan

[21] Appl. No.: 155,999

[22] Filed: Feb. 16, 1988

[30] Foreign Application Priority Data

Feb. 19, 1987 [JP] Japan ............................... 62-36560
Feb. 19, 1987 [JP] Japan ............................... 62-36561
Feb. 19, 1987 [JP] Japan ............................... 62-36562

[51] Int. Cl.$^4$ ............................................. H01S 3/10
[52] U.S. Cl. ................................... 372/9; 372/13; 372/18; 372/32; 307/425
[58] Field of Search ................ 372/9, 13, 18, 28, 32; 307/425

[56] References Cited

U.S. PATENT DOCUMENTS

| | | | |
|---|---|---|---|
| 3,393,955 | 7/1968 | Sterzer | 372/28 |
| 3,485,559 | 12/1969 | De Maria | 372/13 |
| 3,517,330 | 6/1970 | Doyle et al. | 372/32 |
| 4,284,964 | 8/1981 | Maier, Jr. | 372/32 |
| 4,644,267 | 2/1987 | Tsui et al. | 324/77 |

FOREIGN PATENT DOCUMENTS 2083217 3/1982 United Kingdom.
2100858 1/1983 United Kingdom.
2117132 10/1983 United Kingdom.

OTHER PUBLICATIONS

Poon, Ting-Chung, "Method of Two-Dimensional Bipolar Incoherent Image Processing by Acousto-Optic Two-Pupil Synthesis", 2412 *Optics Letters*, May 10, 1985, No. 5, New York, pp. 197–199.

Wickramasinghe, H. K. et al., "Differential Phase Contrast Optical Microscope with 1 A-Depth Resolution", 8030 *Electronics Letters*, vol. 18, Oct. 1982, No. 22, London, pp. 973–975.

*Primary Examiner*—William L. Sikes
*Assistant Examiner*—B. R. R. Holloway
*Attorney, Agent, or Firm*—Oliff & Berridge

[57] ABSTRACT

An optical system for producing an optical output having a beat frequency. The shifter has a beam splitter for splitting a laser radiation generated by a laser source, into a first and a second laser beam, and includes an acoustooptical modulator for deflecting the first laser beam and thereby changing the frequency of the first laser beam. The shifter further has an optical-path changing device such as a convex lens or parabolic reflector for changing an optical path of the first laser beam deflected by the acoustooptical modulator, into parallelism with the optical axis of the changing device. The focal point of the optical-path changing device is located at a point of emission of the deflected first laser beam. A mixer is provided for mixing the deflected first laser beam with the second laser beam, thereby causing an interference between the first and second laser beams, to produce a beat frequency equal to a difference between the frequencies of the first and second laser beams.

18 Claims, 4 Drawing Sheets

OPTICAL SYSTEM FOR PRODUCING CONTROLLED BEAT FREQUENCY

BACKGROUND OF THE INVENTION

1 Field of the Invention

The present invention relates to improvements in an optical system for mixing two light beams having different frequencies, and thereby producing a beat frequency which is considerably lower than the frequencies of the light beams mixed with each other.

2 Discussion of the Prior Art

In the art of optics, it is generally considered difficult to detect a change in the frequency of a radiation, since the detection requires an optical sensor which has an extremely high response. In the light of this recognition, it is desirable to use a light beam having a low beat frequency whose change or variation can be detected by an ordinary optical sensor.

On the other hand, there is proposed a horizontal type Zeeman laser source, wherein a laser tube is subjected to a magnetic field in the axial direction, to generate according to the zeeman effect two laser beams having frequencies different from each other by 1.8 MHz, such that the two laser beams travel along a common axis, so that an optical output having a beat frequency is produced by interference between the two laser beams.

Figures 5, 8:
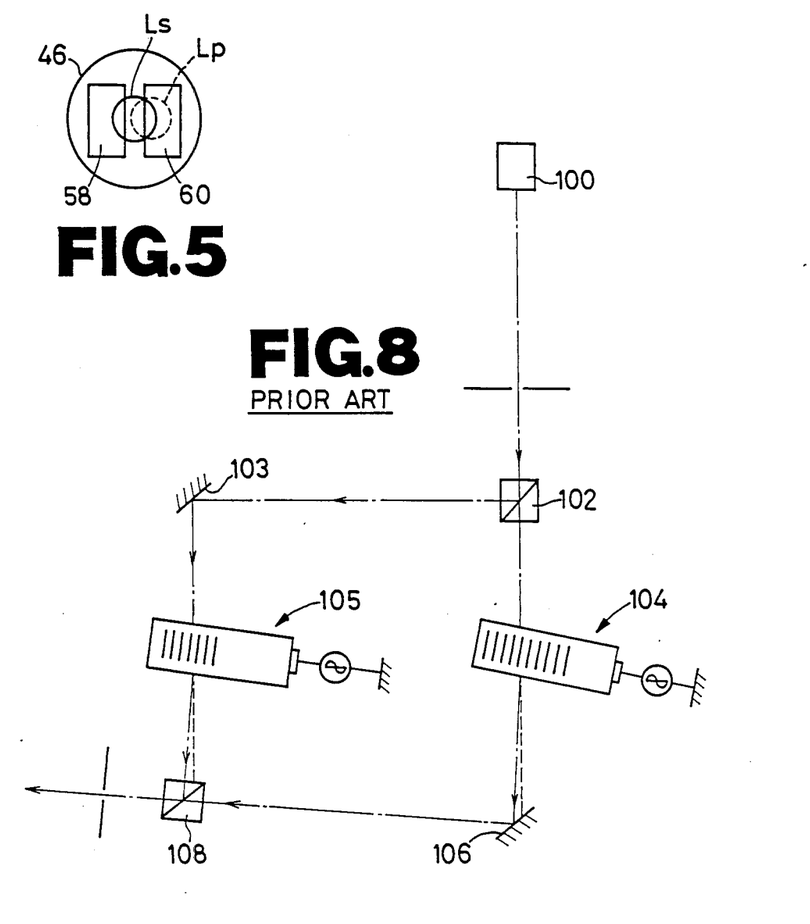
FIG. 8 is a view for explaining a known optical arrangement for producing a heat frequency.

It is also proposed to utilized an acoustooptical modulator which is capable of bending or deflecting an incident light beam, while recognizing the fact that the frequency of the deflected light beam is slightly changed with respect to the frequency of the incident light beam. More specifically, a laser beam having a beat frequency can be obtained due to interference between two laser radiations which are transmitted through a pair of acoustooptical modulators. An example of such a system is illustrated in FIG. 8, wherein a laser radiation produced by a laser source 100 is split by a polarizing beam splitter 102, into a P-type polarized light beam, and an S-type polarized light beam. The P-type polarized light beam is incident upon acoustoopical modulator 104, while the S-type polarized light beam is incident upon another acoustooptical modular 105 via a mirror 103. The light beams incident upon the respective acoustooptical modulators are deflected by these modulators, and the frequencies of the deflected light beams are shifted according to the angles of deflection. The frequency-shifted P-type light is reflected by a mirror 106 and is transmitted through a beam splitter 108. In the meantime, the similarly frequency-shifted S-type light beam is reflected by the beam splitter 108. The P-type and S-type polarized light beams which have been frequency-shifted in different degrees are mixed or combined with each other by the beam splitter 108, whereby an interference takes place between the two frequency-shifted light beams, thereby producing an optical output having a beat frequency which is equal to a difference between the frequencies of the two light beams.

However, the known frequency shifters described above encounter difficulty to change the beat frequency to a desired value. Stated in detail, the horizontal type Zeeman laser source discussed above is only capable of producing a fixed beat frequency of 1.8 MHz, since the difference between the frequencies of the laser beams generated by the Zeeman effect is limited to 1.8 MHz. In the optical frequency shifter utilizing acoustooptical modulators as described above, the coaxial relationship between the P-type and S-type polarized light beams tends to be lost, when a difference between the angles of deflection of the light beams by the modulators is relatively large. Namely, the optical paths of the P-type and S-type light beams may more or less deviate from each other. This tendency increases with a distance between the modulators and the point of mixing of the two light beams. To allow for proper mixing of the P-type and S-type light beams, the difference between the angles of deflection of the light beams by the acoustooptical modulators should be limited to within a fixed narrow range, where the range of the beat frequency that can be obtained is limited.

SUMMARY OF THE INVENTION

It is therefore an object of the present invention to provide an optical system which is capable of producing a beat that can be varied within a comparatively wide range.

The above object may be achieved according to the principle of the present invention, which provides an optical system for mixing two laser beams with each other, and thereby producing an optical output having a beat frequency which is equal to a difference between frequencies of the two laser beams, including: (a) a laser source for generating a laser radiation; (b) a beam splitter for splitting the laser radiation into a first laser beam, and second laser beam; (c) at least one acoustooptical modulator for deflecting at least one of the first and second laser beams, respectively, and thereby changing a frequency of the deflected at least one of the first and second laser beams; (d) optical-path changing means having a focal point on an optical axis thereof, for changing an optical path of at least one of the first and second laser beams deflected by the at least one acoustooptical modulator, into parallelism with the optical axis, the focal point being located at a point of emission of the above-indicated at least one deflected light beam from the at least one acoustooptical modulator; and (e) mixing means for mixing the first and second laser beams at least one of which has been deflected by the at least one acoustooptical modulator, thereby causing an interference between the first and second laser beams, to produce a beat frequency equal to a difference between the frequencies of the first and second laser beams at least one of which has been changed by the at least one acoustooptical modulator.

In the optical system of the present invention constructed as described above, at least one of the frequencies of the first and second beams, for example, the frequency of the first laser beam is changed according to an angle of deflection of the first laser beam by the acoustooptical modulator. The optical path of the deflected first laser beam is changed by the optical-path changing means, into parallelism with the optical axis of the changing means. Namely, the optical path of the deflected first laser beam is held parallel to, and is free from deviation from, the optical path of the second laser beam emitted by the beam splitter, which splits the laser radiation from the single laser source into the first and second beams. Therefore, the deflected first laser beam and the second laser beam (which may or may not be deflected by another acoustooptical modulator) may be suitably mixed or combined with each other, whereby a beat frequency equal to a difference between the two frequencies of the first and second laser beams is obtained. The beat frequency can be changed as desired, by changing the difference between the frequencies of the two laser beams, for example, by changing the frequency of the first laser beam by suitably controlling the appropriate acoustooptical modulator.

The beam splitter may preferably consist of a polarizing beam splitter which splits the laser radiation into a P-type polarized light beam as one of the first and second laser beams, and an S-type polarized light beam as the other of the first and second laser beams.

The optical-path changing means may preferably be a convex lens, a parabolic reflector, or a part-spherical reflector.

Each of the at least one acoustooptical modulator may include a light-transparent substrate having an acoustooptical effect, and a piezoelectric vibrator for generating surface acoustic waves which travel on a surface of the substrate and produce a corresponding periodic change in refractive index in local portions of the substrate, thereby establishing a diffraction grating for diffracting and deflecting at least one of the first and second laser beams. The frequency of the acoustic waves not only determines the frequency of the light beam diffracted or deflected by the acoustooptical effect, but also determines a diffraction constant of the diffraction grating established on the substrate, thereby determining an angle of deflection of the light beam incident upon the acoustooptical substrate. That is, the frequency of the light beam deflected by the acoustooptical effect of the substrate can be changed according to the angle of deflection of the light beam, by changing the frequency of the surface acoustic waves. Generally, the deflection of light by an acoustooptical modulator utilizes primary diffraction of the Bragg diffraction or scattering.

The mixing means may preferably include a beam splitter or a half mirror which receives the first and second laser beams, and outputs the first and second laser beams along a substantially common optical path, thereby producing the optical output having the beat frequency.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
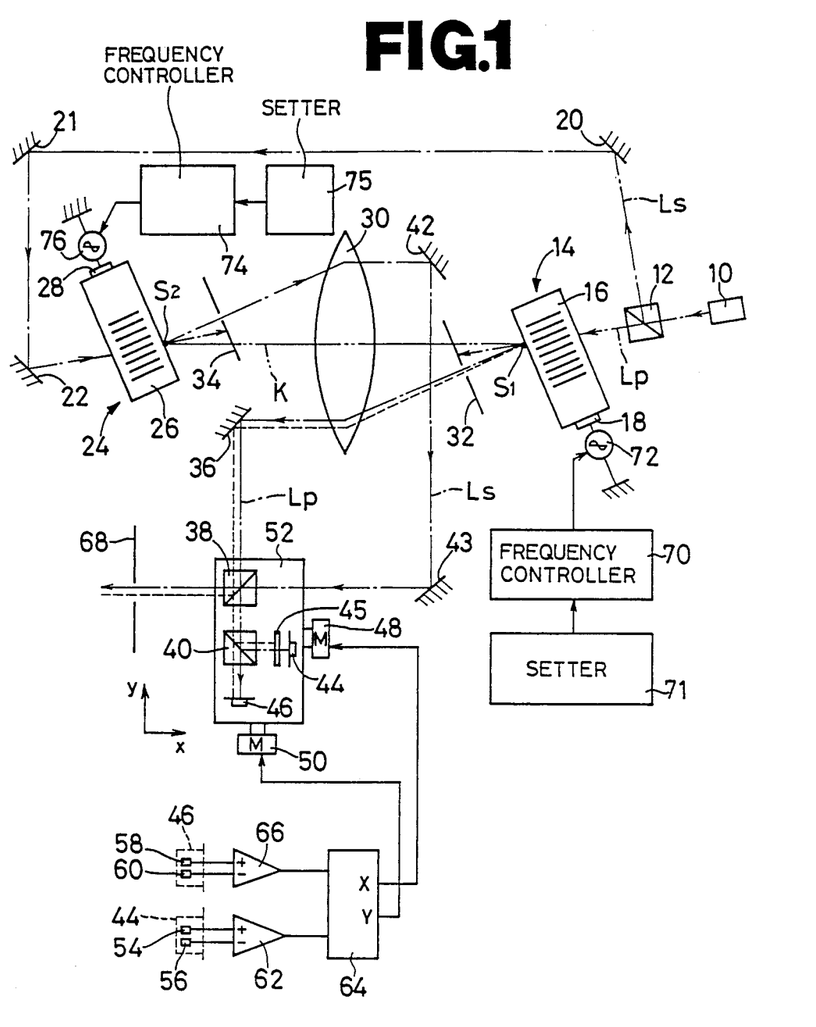
FIG. 1 is a schematic view showing one embodiment of an optical system of this invention frequency shifting.

Referring first to FIG. 1, there is shown the first presently preferred embodiment of the invention, a laser source 10 is adapted to produce a laser radiation, which is incident upon a polarizing beam splitter 12. The incident laser radiation is split into a P-type polarized light beam Lp, and an S-type polarized light beam Ls. The P-type polarized light beam Lp has a plane of wave vibrations which is parallel to a plane of incidence upon the beam splitter 12. The S-type polarized light beam Ls has a plane of wave vibrations perpendicular to the plane of incidence. The "plane of incidence" is defined as a plane which contains the direction of propagation of a light wave striking a surface of the beam splitter 12, and a line normal to the surface (cf. McGraw-Hill Dictionary of Scientific and Technical Terms, Third Edition). The P-type polarized light beam Lp is transmitted through the polarizing beam splitter 12, and is received by a first acoustooptical modulator 14.

The first acoustooptical modulator 14 includes a light-transparent substrate 16 having an acoustooptical effect, and a piezoelectric vibrator 18 which is adapted to generate surface elastic or acoustic waves which travel on the surface of the substrate 16. The surface acoustic waves produce a corresponding periodic change in refractive index in local portions of the substrate 16, which establishes a diffraction grating for modulating the incident light beam Lp, with the frequency of the acoustic waves determining the amount of diffraction or bending or deflection of the light beam Lp. A frequency controller 70 is provided to control an oscillating frequency of an oscillator 72, which supplies the piezoelectric vibrator 18 with a high-frequency drive signal. The frequency controller 70 is operated in response to a preset value of a setter 71, so as to change the oscillation frequency of the oscillator 72, for thereby changing the frequency of the surface acoustic waves generated by the piezoelectric vibrator 18. Accordingly, the frequency of the P-type polarized light beam Lp incident upon the modulator 14 is changed, while the constant of diffraction grating is changed whereby the angle of diffraction of the light beam Lp is varied. Thus, the incident light beam Lp is deflected by an angle corresponding to the controlled frequency of the surface acoustic waves generated by the piezoelectric vibrator 18.

On the other hand, the S-type polarized light beam Ls is reflected by the polarizing beam splitter 12, and is received by a second acoustooptical modulator 24, via reflecting mirrors 20, 21 and 22. Like the first acoustooptical modulator 14, the second modulator 24 includes a light-transparent substrate 26 having an acoustooptical effect, and a piezoelectric vibrator 28 adapted to generate surface elastic or acoustic waves which travel on the surface of the substrate 26, and produce a corresponding periodic change in refractive index in local portions of the substrate 26, which establishes a diffraction grating for bending or deflecting the light beam Ls. A frequency controller 74 is provided to control an oscillating frequency of an oscillator 76, which supplies the piezoelectric vibrator 28 with a high-frequency drive signal. The frequency controller 74 is operated in response to a preset value of a setter 75, so as to change the oscillation frequency of the oscillator 76, for thereby changing the frequency of the surface acoustic waves generated by the piezoelectric vibrator 28. Accordingly, the frequency of the S-type polarized light beam Ls incident upon the modulator 24 is changed, while the constant of diffraction grating is changed. Thus, the angle of diffraction (deflection) of the incident light beam Ls is varied.

The first and second acoustooptical modulators 14, 24 described above are positioned relative to each other, such that an output point S1 (point of emission of the deflected light beam Lp) of the first modulator 14, and an output point S2 (point of emission of the deflected light beam Ls) of the second modulator, lie on an optical axis K of a convex lens 30, and are located at focal points of this convex lens 30. In the present embodiment, the convex lens 30 functions as an element or means for changing optical paths of the light beams Lp and Ls. The convex lens 30 receives, via respective masks 32, 34, the light beams Lp and Ls which are emitted from the points Sl, S2 of the first and second modulators 14, 24. The light beams Lp and Ls incident upon the convex lens 30 are deflected into parallelism with the optical axis K of the lens 30, irrespective of the angle at which the light beams Lp, Ls are deflected by the first and second modulators 14, 24. The masks 32, 34 permit the transmission of only primary diffraction components of the light beams Lp, Ls diffracted by the respective acoustooptical modulators 14, 24.

The P-type polarized light beam Lp deflected by the convex lens 30 into parallelism with its optical axis K is reflected by a mirror 36, and the reflected light beam Lp is incident upon a beam splitter 38 in a "y" direction. The incident light beam Lp is split by the beam splitter 38, into a component which passes straight forward through the splitter 38 and strikes a following beam splitter 40, and a component which is reflected by the splitter 38 at right angles. The reflected component beam is emitted outwardly of the system in an "x" direction. The S-type polarized light beam Ls deflected by the convex lens 30 into parallelism with the optical axis K is reflected by a mirror 42 and a mirror 43, and strikes the beam splitter 38 in the "x" direction. This incident light beam Ls is also split by the splitter 38, into two components. One of the components passes straight forward through the beam splitter 38 and is emitted outwardly of the system in the "x" direction. The other component is reflected by the splitter 38 at right angles, and is received by the following beam splitter 40 in the "y" direction.

As described above, each of the light beams Lp and Ls incident upon the beam splitter 40 is split into two beams propagating in the "x" and "y" directions. Of the light beams Lp, Ls reflected by the beam splitter 40 in the "x" direction, only the light beam Ls passes through a polarizer 45, and is received and detected by an optical sensor 44. The light beams Lp, Ls which pass through the beam splitter 40 are both received and detected by an optical sensor 46. The beam splitters 38, 40, the polarizer 45, and the optical sensors 44, 46 are fixedly disposed on an X-Y table 52 so that their relative positions are not changed. The X-Y table 52 is movable in the "x" direction by an X-axis drive motor 48, and in the "y" direction by a Y-axis drive motor 50. The beam splitters 38, 40 indicated above are also known as a half mirror which transmits a substantially half of the amount of incident light, and reflects the rest amount.

Figure 2:
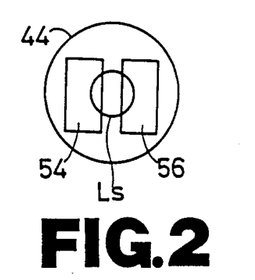
FIGS. 2, 3, 4 and 5 are views illustrating arrangements of detecting portions of optical sensors used in the system of FIG. 1, and positions of light beams received by the detecting portions.
Figure 3:
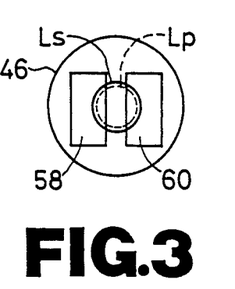

The optical sensor 44 for detecting the S-type polarized light beam Ls which has passed through the polarizer 45 has a light-receiving surface, on which a pair of detecting portions 54, 56 are disposed as indicated in FIG. 2. The detecting portions 54, 56 are spaced apart from each other by a suitable distance, so as to detect an amount of variation of the point of incidence of the light beam Ls in the "y" direction. Similarly, the optical sensor 46 has a light-receiving surface on which a pair of detecting portions 58, 60 are disposed, as shown in FIG. 3, so as to detect amounts of variation of the point of incidence of the light beams Lp and Ls in the "x" direction.

Figure 4:
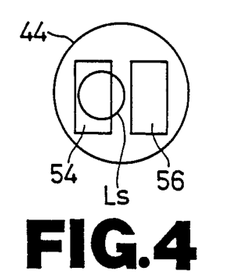

Output signals produced by the detecting portions 54, 56 of the optical sensor 44 are applied to a differential amplifier 62, and a differential output of the amplifier 62 is applied to a motor driver circuit 64. The driver circuit 64 operates to feed a drive signal to the Y-axis drive motor 50, so that the X-Y table 52 is moved along the Y-axis in a direction that causes the output of the differential amplifier 62 to be reduced. In this arrangement, if the center of the light beam Ls is offset or displaced in the "y" direction for some reason or other as indicated in FIG. 4, the X-Y table 52 is automatically moved in the "y" direction, so that the center of the light beam Ls is aligned with the center of the optical sensor 44. Thus, the light beam Ls is maintained at the midpoint between the two detecting portions 54, 56, as shown in FIG. 2. Consequently, the light beam Ls is transmitted through the centers of the beam splitters 38, 40, and is incident upon the center of the optical sensor 46.

Output signals produced by the optical sensor 46 are differentially amplified by a differential amplifier 66. In response to a differential output of the amplifier 66, the motor driver circuit 64 operates to feed a drive signal to the X-axis drive motor 48, so that the X-Y table 52 is moved along the X-axis in a direction that causes the output of the amplifier 66 to be reduced. If the point of incidence of the light beam Lp upon the optical sensor 46 is shifted in the "x" direction as indicated in FIG. 5 due to a change in the frequency of the light beam Lp by the first acoustooptical modulator 14, the X-Y table 52 is automatically moved in the "x" direction so that the center of the light beam Lp is aligned with the center of the center of the optical sensor 46, namely, positioned at the midpoint between the detecting portions 58, 60, as indicated in FIG. 3.

According to the above arrangements, the light beams Ls and Lp which are emitted from the beam splitter 38 are adapted to travel out of the system through a mask 68, such that the optical axes of the two beams are aligned with each other. Thus, the two beams Lp, Ls are mixed with each other, so as to produce an optical output which has a beat frequency equal to a difference between the two frequencies of the light beams Lp and Ls incident upon the beam splitter 38. In the present embodiment, the beam splitter 38 serves as means for mixing two laser beams having different frequencies, in the form of the P-type and S-type polarized light beams Lp and Ls. In FIGS. 2, 3, 4 and 5, the spot of the light beam Ls is indicated by circles in solid line, while the spot of the light beam Lp is indicated by circles in broken line.

An operation of the present optical system will be described below.

An optical output having a desired beat frequency can be obtained, for example, from the S-type polarized light beam Ls whose angle of deflection by the second acoustooptical modulator 24 is held constant, and from the P-type polarized light beam Lp whose angle of deflection by the first acoustooptical modulator 14 is changed with its frequency, by manually o automatically changing the setting of the setter 71 and thereby changing the oscillating frequency of the oscillator 72. The optical paths of the light beams Lp, Ls are shown in broken lines in FIG. 1. With the convex lens 30, a variation in the angle of deflection of the light beam Lp by the first modulator 14 is converted into a variation in the distance between the optical axis K of the convex lens 30, and the optical path of the light beam Lp which is deflected by the convex lens 30 into parallelism with the optical axis K, and therefore with the optical path of the light beam Ls incident upon the beam splitter 38. Thus, the optical paths of the light beams Lp and Ls incident upon the optical sensor 46 are shifted relative to each other, and the points of incidence of the light beams Lp and Ls upon the optical sensor 46 are misaligned with each other, as indicated in FIG. 5. Consequently, the X-Y table 52 is automatically moved in the "x" direction, so that the spot of the light beam Lp is aligned with the center of the optical sensor 46, i.e., with the spot of the light beam Ls which is aligned with the center of the optical sensor 46. As a result, the light beams Lp, Ls emitted from the beam splitter 38 outwardly of the system are aligned with each other, whereby these light beams Lp, Ls are suitably mixed or combined with each other, thereby producing an optical output of the system which has a beat frequency equal to the difference of the frequencies of the light beams Lp and Ls.

In the present embodiment, the P-type polarized light beam Lp of the two beams Lp, Ls obtained from the single laser source 10 is deflected and frequency-modulated by the first acoustooptical modulator 14. The deflected light beam Lp is deflected by the convex lens 30, so that the optical path of the light beam Lp is eventually parallel with the optical path of the light beam Ls. The parallelism of the optical paths of the light beams Lp, Ls prevents deviation of the light beams Lp, Ls emitted from the beam splitter 38, from each other, thereby permitting correct mixing of these different-frequency light beams Lp, Ls, whereby a beat frequency is produced by interference between the two light beams Lp, Ls having different frequencies. Described more specifically, the beat frequency determined by the difference between the frequencies of the light beams Lp, Ls can be continuously changed as desired, by changing the vibrating frequency of the piezoelectric vibrator 18 of the first acoustooptical modulator 14, and thereby changing the frequency of the light beam Lp. If the setting value of the setter 71 is changed in steps, the beat frequency can be varied in steps.

Another embodiment of the invention will be described. Same reference numerals as used in the preceding embodiment will be used to identify the components of the present embodiment which correspond to those of the preceding embodiment. Redundant description of these corresponding components will not be provided.

Figure 6:
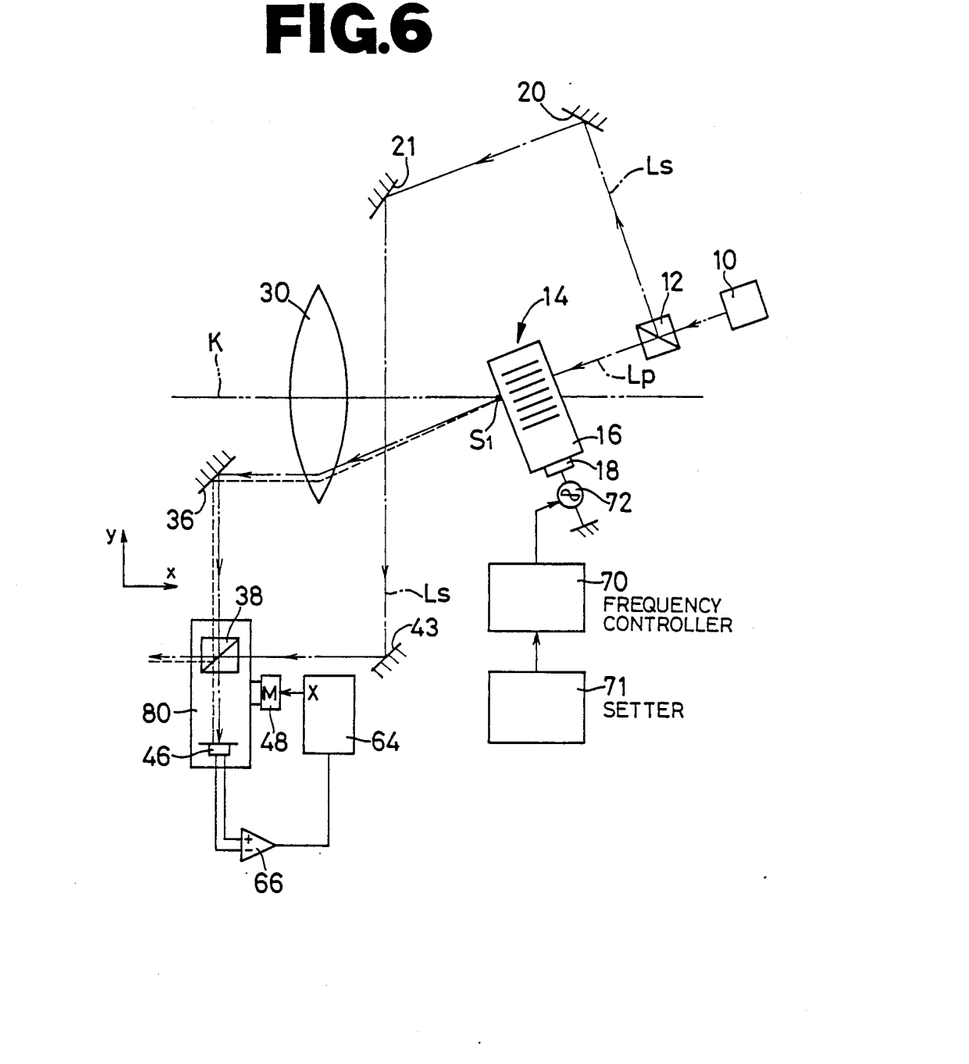
FIGS. 6 and 7 are views each corresponding to that of FIG. 1, showing other embodiments of the invention.

In FIG. 6, the S-type polarized light beam Ls reflected by the polarizing beam splitter 12 is received by the non-polarizing beam splitter 38 in the "x" direction, via the mirrors 20, 21 and a mirror 43, but without passing through an acoustooptical modulator. In the present embodiment, the beam splitter 38 and optical sensor 46 described above are disposed on an X table 80 which is movable only in the "x" direction by the X-axis drive motor 48. The components of the light beams Lp, Ls emitted from the beam splitter 38 in the "y" direction are received by the optical sensor 46. The beam splitter 38 and the optical sensor 46 are usually positioned so that the light beam Ls is aligned with the center of the optical sensor 46, irrespective of the position of the X table 80 in the "x" direction. The motor driver circuit 64 operates so as to control the position of the X table 80 in the "x" direction, so that the light beam Lp incident upon the optical sensor 46 is aligned with the light beam Ls aligned with this sensor, as shown in FIG. 3. In this arrangement, the light beams Lp and Ls emitted from the beam splitter 38 outwardly in the "x" direction can be correctly mixed or combined with each other, thereby producing an optical output which has a beat frequency equal to the difference between the frequencies of the light beams Lp, Ls. Accordingly, the beat frequency of the optical output obtained by the present system can be continuously changed, by changing the frequency of the light beam Lp which is controlled by the first acoustooptical modulator 14 according to the setting of the setter 71, as described above.

Figure 7:
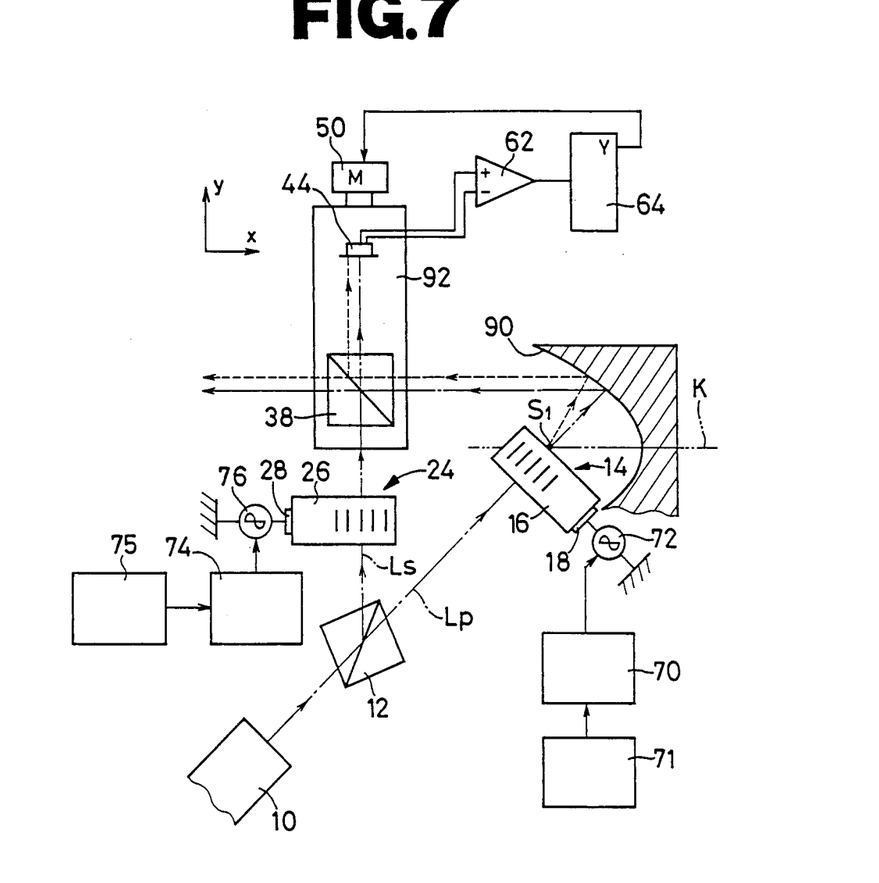

Referring next to FIG. 7, there is shown a further modified embodiment of the invention, which utilizes a parabolic reflector or mirror 90 as means for changing the optical path of the light beam Lp produced by the first acoustooptical modulator 14. Described in greater detail, the light beams Lp, Ls produced from the polarizing beam splitter 12 are received by the first and second acoustooptical modulators 14, 24, respectively. The first modulator 14 and the parabolic reflector 90 are positioned relative to each other such that the output point Sl of the modulator 14 is located at the focal point of the parabolic reflector 90. Hence, the optical path of the light beam Lp deflected by the first acoustooptical modulator 14 is changed into parallelism with the optical axis K of the parabolic reflector 90, irrespective of the angle of deflection of the light beam Lp by the modulator 14. Consequently, the light beam Lp reflected by the parabolic reflector 90 is incident upon the beam splitter 38 in the "x" direction. The light beam Lp received by the beam splitter 38 is split into a beam which passes through the splitter 38 and travels outwardly in the "x" direction, and a beam which is reflected in the "y" direction by the splitter 38 and received by the optical sensor 44. On the other hand, the light beam Ls emitted from the second modulator 24 is received by the beam splitter 38 in the "y" direction. The light beam Ls received by the splitter 30 is split into a beam which is reflected outwardly in the "x" direction by the splitter 38, and a beam which passes through the splitter 38 in the "y" direction and strikes the optical sensor 44.

The beam splitter 38 and optical sensor 44 described above are disposed on a Y table 92 which is movable only in the "y" direction by the Y-axis drive motor 50. The light beams Lp, Ls emitted from the beam splitter 38 are properly received by the optical sensor 44. Described more specifically, the beam splitter 38 and the optical sensor 44 are usually positioned so that the light beam Ls is aligned with the center of the optical sensor 44, irrespective of the position of the Y table 92 in the "y" direction. The motor driver circuit 64 operates so as to control the position of the Y table 92 in the "y"0 direction, so that the light beam Lp incident upon the optical sensor 44 is aligned with the light beam Ls aligned with this sensor, as shown in FIG. 3. In this arrangement, the light beams Lp and Ls emitted from the beam splitter 38 outwardly in the "x" direction can be correctly mixed or combined with each other, thereby producing an optical output which has a beat frequency equal to the difference between the frequencies of the light beams Lp, Ls. In the present embodiment, too, the beat frequency of the optical output can be continuously changed, by changing the frequency of the light beam Lp which is controlled by the first acoustooptical modulator 14 according to the setting of the setter 71, as described above.

While the present invention has been described in detail in its presently preferred embodiments by reference to the accompanying drawings, it is to be understood that the invention may be otherwise embodied.

In the embodiment of FIG. 1, for example, the beat frequency determined by the difference between the frequencies of the light beams Lp, Ls can also be changed continuously, by changing the frequency of the light beam Ls (by changing the angle of deflection by the second acoustooptical modulator 24) according to the setting of the setter 75, while maintaining a constant angle of deflection of the light beam Lp by the first acoustooptical modulator 14. In this case, the X-Y table 52 is automatically moved in the "y" direction, so that the optical paths of the light beams Lp and Ls emitted outwardly from the beam splitter 38 are aligned with each other. It is also possible to continuously change the beat frequency, by simultaneously changing the angles of deflection of the light beams Lp and Ls by the respective modulators 14, 24.

In the embodiment of FIG. 7, another parabolic reflector may be provided in facing relation with the parabolic reflector 90, so that the light beam Ls emitted from the second acoustooptical modulator 24 is reflected by that additional parabolic reflector into parallelism with the optical axes K of the reflectors, before the reflected light beam Ls is received by the beam splitter 38. Further, the second acoustooptical modulator 24 can be eliminated. As a still further modification, it is possible to replace the parabolic reflector 90 by a spherical reflector (part-spherical reflector), or other concave reflector which is capable of reflecting a light beam incident thereupon through its focal point, into parallelism with its optical axis.

In the illustrated embodiments, the beam splitter 38 is disposed on the movable X-Y table 52, X table 80 or Y table 92 so that the optical paths of the light beams Lp and Ls emitted from the splitter 38 can be aligned with each other. However, the variable beat frequency can be obtained even if the beam splitter 38 is fixed in position, provided the angle of deflection of the light beam Lp by the first acoustooptical modulator 14 is relatively small.

Although the illustrated embodiments use the polarizing beam splitter 12 for splitting the laser radiation from the laser source 10, the beam splitter 12 may be replaced by a half mirror or similar element.

Further, the optical path arrangements in the illustrated embodiment may be suitably modified, and other optical elements may be incorporated in the system, as needed.

It is further to be understood that the illustrated embodiments are provided by means of example only, and that various other changes, modifications and improvements may be made in the invention, without departing from the spirit of the invention defined in the following claims.

What is claimed is:

1. An optical beat-frequency producing system for mixing two laser beams with each other, and thereby producing an optical output having a beat frequency which is equal to a difference between frequencies of the two laser beams, comprising:
   a laser source for generating a laser radiation;
   a beam splitter for splitting said laser radiation into a first laser beam, and a second laser beam;
   at least one acoustooptical modulator for deflecting a corresponding one of said first and second laser beams, and thereby changing a frequency of the deflected corresponding one of said first and second laser beams so as to produce a difference between the frequencies of the first and second laser beams;
   optical-path changing means having a focal point on an optical axis thereof, for changing an optical path of said corresponding one of said first and second laser beams deflected by said at least one acoustooptical modulator, into parallelism with said optical axis, said focal point being located at a point of emission of said at least one deflected light beam from said at least one acoustooptical modulator;
   mixing means located relative to said optical-path changing means, so as to receive said first and second laser beams which are made parallel with said optical path by said optical-path changing means, said mixing means mixing said first and second laser beams and thereby causing an interference between said first and second laser beams, to produce a laser beam having a beat frequency equal to said difference between frequencies of said first and second laser beams at least one of which has been changed by said at least one acoustooptical modulator;
   control means for controlling said at least one acoustooptical modulator, so as to change the frequency of at least one of said first and second laser beams deflected by said at least one acoustooptical modulator, so as to change said difference between the frequencies of said first and second laser beams incident upon said mixing means, and thereby change said beat frequency; and
   movable support means for supporting said mixing means fixed thereon, said support means being movable according to an angle of deflection of said deflected corresponding one of said first and second laser beams, so that optical paths of said first and second laser beams incident upon said mixing means are substantially aligned with each other.

2. An optical beat-frequency producing system according to claim 1, wherein said beam splitter consists of a polarizing beam splitter which splits said laser radiation into a P-type polarized light beam as one of said first and second laser beams, and an S-type polarized light beam as the other of said first and second laser beams.

3. An optical beat-frequency producing system according to claim 1, wherein said optical-path changing means is selected from the group consisting of a convex lens, a parabolic reflector and a part-spherical reflector.

4. An optical beat-frequency producing system according to claim 1, wherein said at least one acoustooptical modulator includes a light-transparent substrate having an acoustooptical effect, and a piezoelectric vibrator for generating surface acoustic waves which travel on a surface of said substrate and produce a corresponding periodic change in refractive index in local portions of the substrate, thereby establishing a diffraction grating for diffracting and deflecting said corresponding one of said first and second laser beams, whereby the frequency of the deflected laser beams is determined by the frequency of said acoustic waves.

5. An optical beat-frequency producing system according to claim 4, further comprising control means for controlling a vibrating frequency of said piezoelectric vibrator, and thereby changing said frequency of said surface acoustic waves to change said frequency of said deflected laser beam.

6. An optical beat-frequency producing system according to claim 1, wherein said at least one acoustooptical modulator consists of two acoustooptical modulators for deflecting each corresponding one of said first and second laser beams, respectively, and changing the frequencies of the deflected first and second laser beams.

7. An optical beat-frequency producing system according to claim 6, wherein said optical-path changing means consists of a single convex lens for deflecting said deflected first and second laser beam into parallelism with an optical axis thereof, said convex lens having two focal points at respective points of emission of said deflected first and second laser beams from said respective two acoustooptical modulators.

8. An optical beat-frequency producing system according to claim 6, wherein said optical-path changing means consists of a single parabolic reflector for reflecting one of said deflected first and second laser beams, such that the reflected one laser beam is parallel to an optical axis of said parabolic reflector, said parabolic reflector having a focal point at a point of emission of said deflected one laser beam from a corresponding one of said two acoustooptical modulators.

9. An optical beat-frequency producing system according to claim 1, wherein said at least one acoustooptical modulator consists of a single acoustooptical modulator for deflecting one of said first and second laser beams, and changing the frequency of said one laser beam, the frequency of the other of said first and second laser beams being held constant, whereby said difference is produced.

10. An optical beat-frequency producing system according to claim 9, wherein said optical-path changing means consists of a single convex lens for deflecting the deflected one of said first and second laser beams into parallelism with a focal point thereof, and convex lens having a focal point at a point of emission of said deflected one laser beam from said single acoustooptical modulator.

11. An optical beat-frequency producing system according to claim 1, wherein said at least one acoustooptical modulator consists of two acoustooptical modulators for deflecting said first and second laser beams, respectively, and changing the frequencies of the deflected first and second laser beams, said control means including two frequency controllers for controlling said two acoustooptical modulators.

12. An optical beat-frequency producing system according to claim 1, wherein said at least one acoustooptical modulator consists of a single acoustooptical modulator for deflecting one of said first and second laser beams, and changing the frequency of the deflected one of said first and second laser beams, said control means comprises a frequency controller for controlling said single acoustooptical modulator.

13. An optical beat-frequency producing system according to claim 1, further comprising detecting means for detecting said angle of deflection of said deflected corresponding one laser beam, and drive means for moving said movable support means according to said angle deflection detected by said detecting means.

14. An optical beat-frequency producing system according to claim 13, wherein said mixing means fixed on said movable support means consists of a second beam splitter which receives one of said first and second laser beams in one of two mutually perpendicular directions, and which receives the other laser beam in the other direction.

15. An optical beat-frequency producing system according claim 14, wherein said at least one acoustooptical modulator consists of two acoustooptical modulators for detecting said first and second laser beams, and said movable support means is movable in both of said two mutually perpendicular directions.

16. An optical beat-frequency producing system according to claim 14, wherein said at least one acoustooptical modulator consists of a single acoustooptical modulator for deflecting one of said first and second laser beams, and said movable support means is movable in only one of said mutually perpendicular directions.

17. An optical beat-frequency producing system according to claim 14, wherein said detecting means comprises a third beam splitter which receives portions of said first and second laser beams incident upon said second beam splitter of said mixing means, and at least one optical sensor which receives light beams from said third beam splitter to detect an amount of change in the point of incidence of one of said light beams upon said at least one optical sensor, in one of said two mutually perpendicular directions, with respect to the point of incidence of the other light beam.

18. An optical beat-frequency producing system according to claim 17, wherein each said at least one optical sensor includes two detecting portions which are spaced apart from each other in said one direction, and which produce outputs applied to a differential amplifier, said drive means being operated according to an output of said differential amplifier.

* * * * *